US012751344B2

(12) United States Patent
Fanshier

(10) Patent No.: US 12,751,344 B2
(45) Date of Patent: Oct. 6, 2026

(54) AGRICULTURAL IMPLEMENTS HAVING FOLDABLE MARKER ASSEMBLIES

(71) Applicant: AGCO Corporation, Duluth, GA (US)

(72) Inventor: Benjamin Anson Fanshier, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 776 days.

(21) Appl. No.: 18/152,847

(22) Filed: Jan. 11, 2023

(65) Prior Publication Data

US 2023/0240167 A1 Aug. 3, 2023

Related U.S. Application Data

(60) Provisional application No. 63/267,392, filed on Feb. 1, 2022.

(51) Int. Cl.

*A01B 63/32* (2006.01)
*A01B 69/02* (2006.01)
*A01B 73/04* (2006.01)

(52) U.S. Cl.

CPC ............ *A01B 63/32* (2013.01); *A01B 69/022* (2013.01); *A01B 69/024* (2013.01); *A01B 73/044* (2013.01)

(58) Field of Classification Search

CPC ......... A01B 63/02; A01B 63/10; A01B 63/14; A01B 63/24; A01B 63/32; A01B 69/02; A01B 69/022; A01B 69/024; A01B 73/00; A01B 73/02; A01B 73/04; A01B 73/042; A01B 73/044

USPC ................................ 172/324, 395, 430, 440

See application file for complete search history.

(56) References Cited

U.S. PATENT DOCUMENTS

| | | | | | |
|---|---|---|---|---|---|
| 4,151,886 | A * | 5/1979 | Boetto | A01B 73/02 | 172/311 |
| 4,204,575 | A * | 5/1980 | Richardson | A01B 73/046 | 172/1 |
| 5,964,179 | A * | 10/1999 | Holloway, Jr. | A01B 69/022 | 116/211 |
| 6,019,178 | A * | 2/2000 | Redekop | A01B 61/04 | 172/126 |
| 6,257,343 | B1 * | 7/2001 | Maenle | A01B 69/024 | 172/126 |
| 8,011,439 | B2 * | 9/2011 | Gadzella | A01B 73/02 | 172/126 |
| 9,198,340 | B2 * | 12/2015 | Grollmes | A01B 73/046 | |
| 11,140,806 | B2 | 10/2021 | Koch | | |
| 2020/0084951 | A1 | 3/2020 | Fanshier | | |

FOREIGN PATENT DOCUMENTS

CA 2886167 C 7/2017

* cited by examiner

*Primary Examiner* — Christopher J Sebesta
*Assistant Examiner* — Evan A Bregel

(57) ABSTRACT

An agricultural implement includes a frame supporting a plurality of ground-engaging tools and a foldable marker assembly having a first marker arm coupled to the frame at a first pivot joint. The first marker arm is operable to pivot between an extended position extending laterally outward from the frame and a folded position at an acute angle relative to the frame.

12 Claims, 5 Drawing Sheets

AGRICULTURAL IMPLEMENTS HAVING FOLDABLE MARKER ASSEMBLIES

CROSS-REFERENCE TO RELATED APPLICATION

This application claims the benefit of the filing date of U.S. Provisional Patent Application 63/267,392, "Agricultural Implements Having Foldable Marker Assemblies," filed Feb. 1, 2022, the entire disclosure of which is incorporated herein by reference.

FIELD

Embodiments of the present disclosure relate generally to agricultural implements, and particularly to planters or other implements that have foldable markers to indicate a next path for the implement through a field.

BACKGROUND

It is well known in the art that some agricultural implements, such as planters and drills, need to be moved precisely along a field. For instance, when an operator is planting the field and/or applying fertilizer to the field, it is desirable to completely cover a predetermined area of the field by making multiple passes across the field with the implement. In making such planting and/or fertilization passes, the operator will generally prefer to minimize overlapping coverage by adjacent passes. By minimizing overlapping of adjacent passes, the operator will generally minimize seed and/or fertilizer waste, reduce planting and/or fertilization time, and reduce fuel usage and other associated operation costs.

Thus, to provide suitable planting efficiency, implements have long included a shiftable marker with a coulter disc. In the conventional form, the marker is selectively shifted to extend laterally from the implement so that the coulter disc cuts into the ground at a location spaced laterally from the implement. Thus, as the implement makes a pass along the field, the disc cuts a trench in the field parallel to the pass. The trench serves as a visual indicator for the operator to follow and align the implement during the next adjacent pass. When field operations are completed, the marker may be retracted from its extended (or unfolded) condition so that the implement can be transported.

One exemplary foldable marker assembly 500 is shown in FIG. 5 in a folded configuration. A frame 502 of an implement is supported by one or more wheels 504. The foldable marker assembly 500 includes a marker arm 506 rotatably coupled to the frame 502 at a pivot joint 508, and a marker arm 510 is rotatably coupled to the marker arm 506 at a pivot joint 512. An extension 514 can extend to change the position of a marker device 516 (e.g., a coulter wheel) relative to the marker arm 510. A cylinder 518 controls the folding and unfolding of the foldable marker assembly 500. When unfolded, the marker device 516 can extend from the frame 502 by a distance approximately equal to the sum of the lengths of the marker arm 506, the marker arm 510, and the extendible portion of the extension 514. Further details can be found in U.S. Pat. No. 9,198,340, "Agricultural Implement Marker Foldable About Compound Angle," granted Dec. 1, 2015.

Another exemplary foldable marker assembly 600 is shown in FIG. 6 in a folded configuration. The frame 602 is connected to a marker arm 604 at a pivot joint 606, which may be connected to additional marker arms 608, 610, 612 at additional pivot joints 614, 616, 618. Cylinders 620, 622, 624 control the folding and unfolding of the foldable marker assembly 600. When unfolded, the marker device 516 in FIG. 6 can extend from the frame 602 by a distance approximately equal to the sum of the lengths of the marker arms 604, 608, 610, and 612. When folded, the parts of the foldable marker assembly 600 should not interfere with other components 626 (shown schematically as a box) of the implement carried by the frame 602, such as product tanks and other hardware.

When in the folded configuration, foldable marker assemblies can limit the space available for other components of the implement (i.e., the foldable marker assemblies need room in which to fold). However, folding or other retraction is important for transport, such as to clear overhead utility lines, and to stay within travel lanes on public roads. Each additional marker arm or extension adds extendible length, but also adds complexity in terms of controls, manufacturing, and repair.

BRIEF SUMMARY

In one aspect, an agricultural implement includes a frame supporting a plurality of ground-engaging tools and a foldable marker assembly having a first marker arm coupled to the frame at a first pivot joint. The first marker arm is operable to pivot between an extended position extending laterally outward from the frame, and a folded position at an acute angle relative to the frame.

The implement may also include a first cylinder coupled to the frame and the first marker arm, which first cylinder (e.g., a hydraulic cylinder) is configured to control an orientation of the first marker arm relative to the frame.

A second marker arm may optionally be coupled to the first marker arm at a second pivot joint, in which case the second marker arm is operable to pivot between an extended position extending laterally outward from the first marker arm, and a folded position at an acute angle relative to the first marker arm.

A second cylinder (e.g., a hydraulic cylinder) may be coupled to the first marker arm and the second marker arm, and may be configured to control an orientation of the second marker arm relative to the first marker arm.

The implement may optionally include a third marker arm coupled to the second marker arm at a third pivot joint, where the third marker arm is operable to pivot between an extended position extending laterally outward from the second marker arm, and a folded position at an acute angle relative to the second marker arm. A third cylinder (e.g., a hydraulic cylinder) may be coupled to the second marker arm and the third marker arm, and may be configured to control an orientation of the third marker arm relative to the second marker arm.

If multiple hydraulic cylinders are present, one or more hydraulic lines may connect the first cylinder, the second cylinder, and/or the third cylinder. The cylinders are connected to a hydraulic source, which may be a part of the implement or a tractor pulling the implement.

The foldable marker assembly may include a marker device coupled to the first marker arm, the second marker arm, or the third marker arm. In some aspects, the foldable marker assembly may include a support wheel. The marker device may include a coulter assembly, a material dispenser, or other marker device.

The implement may also include a stabilizing support coupled to the frame and configured to support the first marker arm in the folded position.

The frame is operable to fold between a field position and a transport position. In the field position, the frame is oriented perpendicular to a forward direction of travel. In the transport position, the frame is oriented toward or parallel to the forward direction of travel.

Other technical features may be readily apparent to one skilled in the art from the following figures, descriptions, and claims.

Within the scope of this application it should be understood that the various aspects, embodiments, examples, and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

The illustrations presented herein are not actual views of any agricultural implement or portion thereof, but are merely idealized representations to describe example embodiments of the present disclosure. Additionally, elements common between figures may retain the same numerical designation.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all the elements that form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

As used herein, the terms “comprising,” “including,” “containing,” “characterized by,” and grammatical equivalents thereof are inclusive or open-ended terms that do not exclude additional, unrecited elements or method steps, but also include the more restrictive terms “consisting of” and “consisting essentially of” and grammatical equivalents thereof.

As used herein, the term “may” with respect to a material, structure, feature, or method act indicates that such is contemplated for use in implementation of an embodiment of the disclosure, and such term is used in preference to the more restrictive term “is” so as to avoid any implication that other, compatible materials, structures, features, and methods usable in combination therewith should or must be excluded.

As used herein, the term “configured” refers to a size, shape, material composition, and arrangement of one or more of at least one structure and at least one apparatus facilitating operation of one or more of the structure and the apparatus in a predetermined way.

As used herein, the singular forms following “a,” “an,” and “the” are intended to include the plural forms as well, unless the context clearly indicates otherwise.

As used herein, the term “and/or” includes any and all combinations of one or more of the associated listed items.

As used herein, spatially relative terms, such as “beneath,” “below,” “lower,” “bottom,” “above,” “upper,” “top,” “front,” “rear,” “left,” “right,” and the like, may be used for ease of description to describe one element’s or feature’s relationship to another element(s) or feature(s) as illustrated in the figures. Unless otherwise specified, the spatially relative terms are intended to encompass different orientations of the materials in addition to the orientation depicted in the figures.

Figure 1:
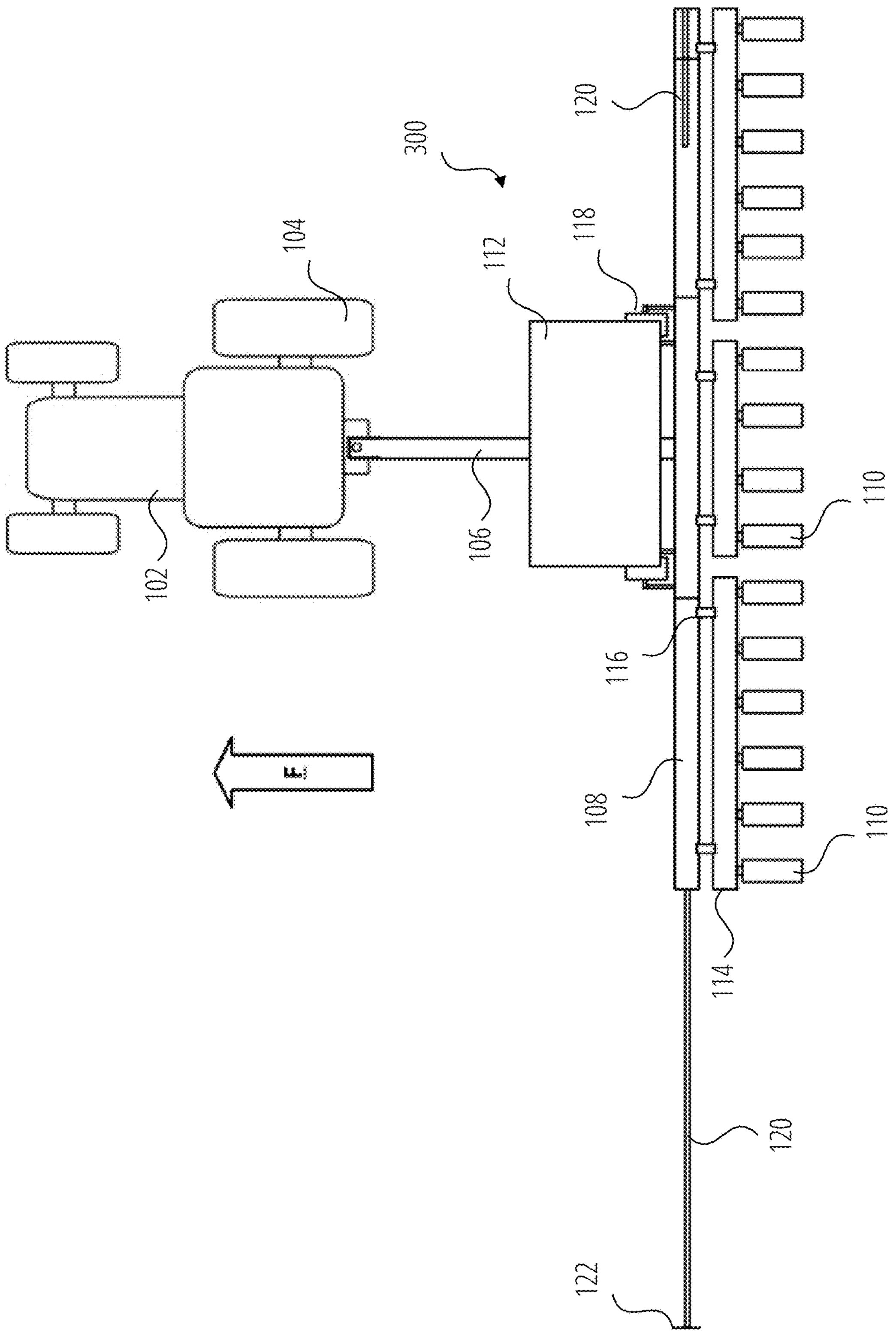
FIG. 1 is a simplified top view of a tractor pulling an agricultural implement having a foldable marker assembly in a field (working) configuration.

FIG. 1 is a simplified top view of a tractor 102 pulling an implement 300 in a forward direction of travel F. The tractor 102 is supported by wheels 104 or tracks. A drawbar 106 connects the implement 300 to a hitch of the tractor 102. The implement 300 includes a frame 108 supporting row units 110 at preselected locations, and may also support a tank 112 carrying seeds, fertilizer, a pesticide, etc. The row units 110 may be carried by one or more toolbars 114, which may be adjustable relative to the frame 108 by mounts 116. The row units 110 may include various ground-engaging tools, such as opening discs, seed meters, closing discs, material applicators, tillage tools, etc. One or more wheels 118 may support the frame 108 as the implement 300 travels in the field. Foldable marker assemblies 120 carrying marker devices 122 are carried by the frame 108 and are configured to extend from the frame 108 to mark a position in the field, typically a desired line of travel for the tractor 102 on a return pass. The foldable marker assembly 120 attached to the left side of the frame 108 is depicted as extended, and the foldable marker assembly 120 attached to the right side of the frame 108 is depicted as folded. The left and right foldable marker assemblies 120 may be independently folded or extended, based on where the operator wishes to mark the field. If no marking is needed, both may be folded.

Figure 2:
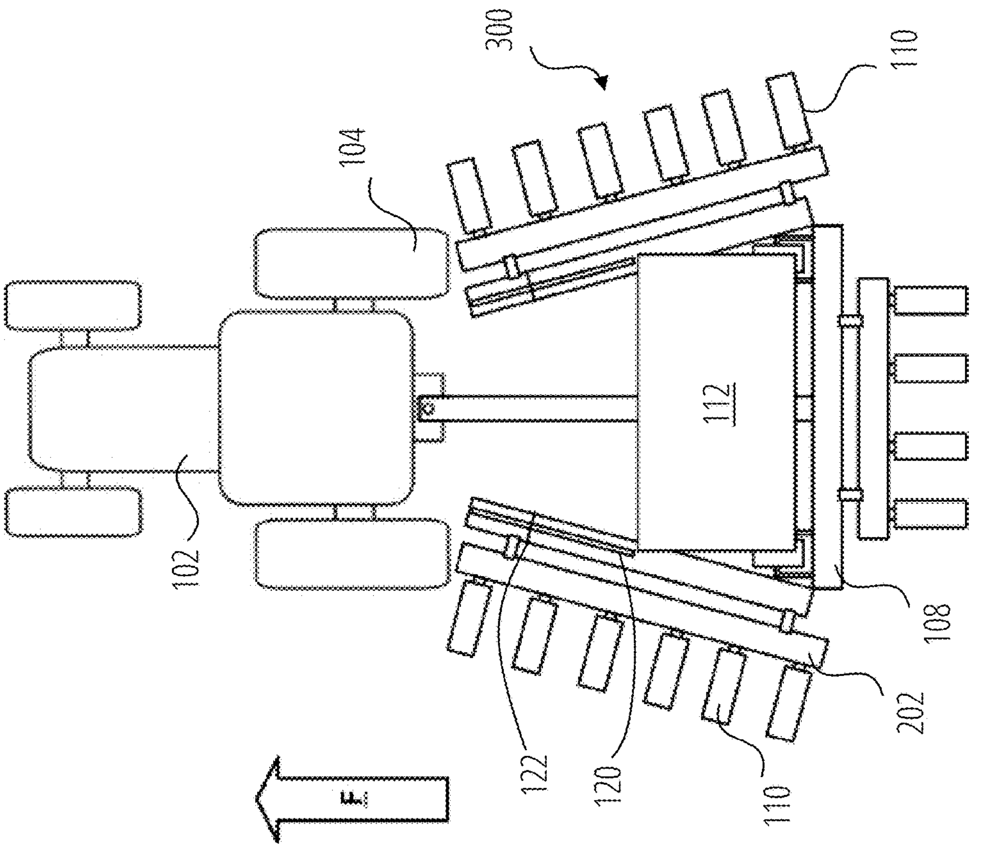
FIG. 2 is a simplified top view of the tractor and agricultural implement shown in FIG. 1 when the implement and the foldable marker assembly are in a folded (transport) configuration.

FIG. 2 is a simplified to view of the tractor 102 and the implement 300 when the implement 300 is in a folded position (e.g., for travel on a public roadway). Both foldable marker assemblies 120 are folded over their respective portions of the frame 108. The frame 108 is also folded inward and forward to decrease the width of the implement 300.

Figure 3:
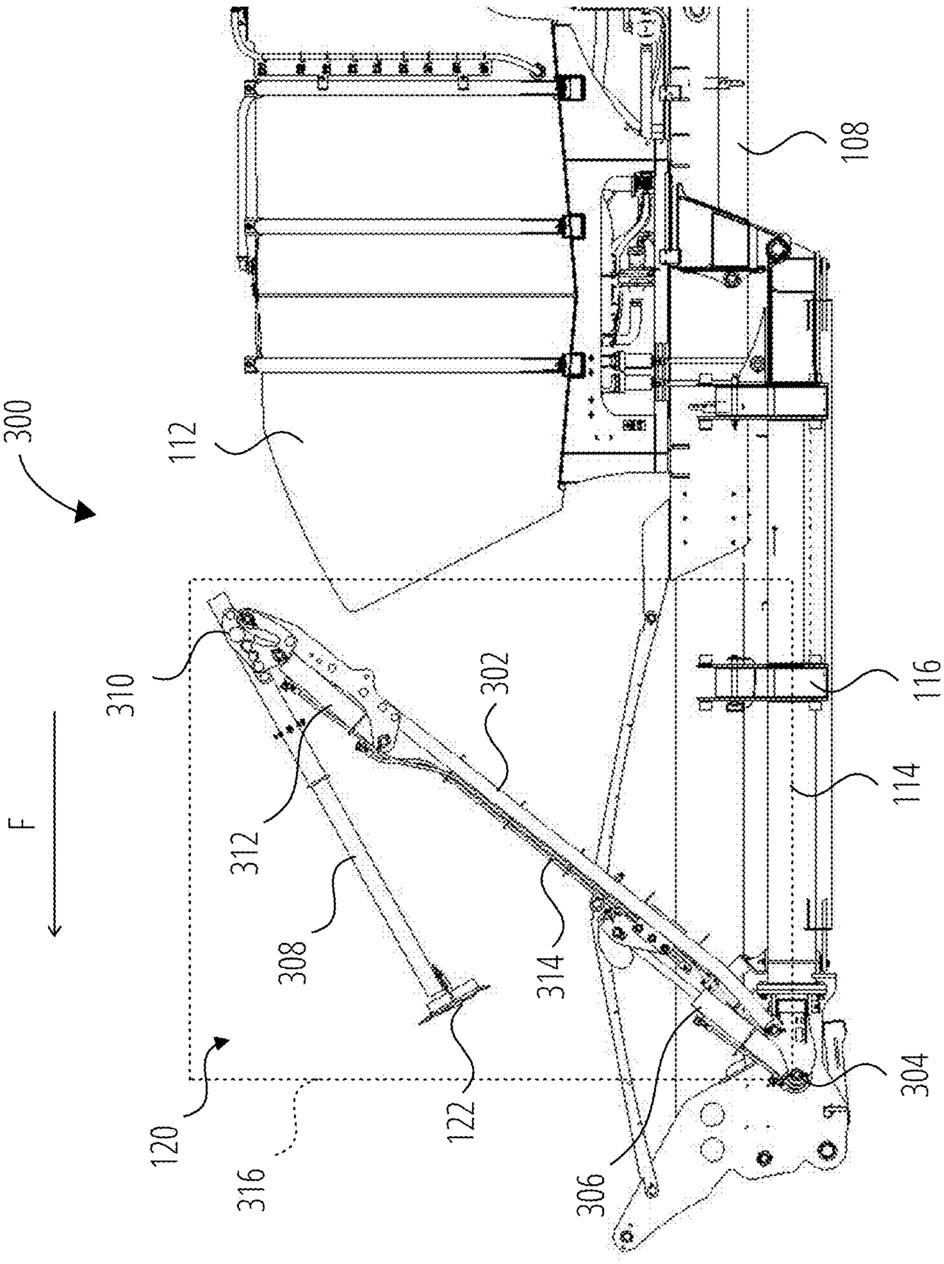
FIG. 3 is a simplified side view of the implement and the foldable marker assembly of FIG. 1 in a folded (transport) configuration.

FIG. 3 is a simplified side view of the agricultural implement 300 having a frame 108 and a foldable marker assembly 120, in which the frame 108 and foldable marker assembly 120 are folded for transport (e.g., as shown in FIG. 2). The foldable marker assembly 120 can be extended to mark a location in a field, as depicted in FIG. 1. Typically, the foldable marker assembly 120 is used to identify a line for the tractor 102 to follow on the next pass through the field such that the row units 110 of the implement 300 do not retrace parts of the field already worked (e.g., planted, tilled, fertilized, etc.). The frame 108 is operable to fold between a field position (FIG. 1) and a transport position (FIG. 2). In the field position, the frame is oriented perpendicular to a forward direction of travel F, and in the transport position, the frame is oriented toward or parallel to the forward direction of travel F. Folding implement frames are described, for example, in U.S. Pat. No. 11,140,806, "Agricultural Toolbar Apparatus, Systems, and Methods," issued Oct. 12, 2021.

In some embodiments, the frame 108 may carry one or more toolbars 114, which may in turn carry the ground-engaging tools (e.g., row units 110). The toolbars 114, if present, may be connected to the frame 108 by one or more mounts 116. The mounts 116 may be, for example brackets and pivot arms configured to enable movement of the toolbar 114 relative to the frame 108, as described in U.S. Patent Publication 2020/0084951 A1, "Implement Contouring Toolbar," published Mar. 19, 2020.

The foldable marker assembly 120 is connected to the frame 108, and includes a first marker arm 302 and a marker device 122. The first marker arm 302 is pivotally coupled to the frame 108 at a first pivot joint 304, such that the first marker arm 302 can pivot between an extended position (extending laterally outward from the frame 108, as in FIG. 1) and a folded position (FIG. 2 and FIG. 3) in which the first marker arm 302 forms an acute angle relative to the frame 108. A first cylinder 306 is coupled to the frame 108 and the first marker arm 302. The first cylinder 306 is configured to control an orientation (i.e., angle) of the first marker arm 302 relative to the frame 108.

The first cylinder 306 may be a hydraulic cylinder, which may be connected to a hydraulic source on the implement 300 or on the tractor 102 pulling the implement 300. The first cylinder 306 may be controlled by a control system associated with the implement 300 (e.g., in the cab of the tractor 102).

A second marker arm 308 may be pivotally coupled to the first marker arm 302 at a second pivot joint 310, such that the second marker arm 308 can pivot between an extended position (extending laterally outward from the first marker arm 302, as in FIG. 1) and a folded position (FIG. 3) at an acute angle relative to the first marker arm 302. A second cylinder 312 is coupled to the first marker arm 302 and the second marker arm 308, and is configured to control an orientation (i.e., angle) of the second marker arm 308 relative to the first marker arm 302. The second cylinder 312 may likewise be a hydraulic cylinder, and may be connected to the first cylinder 306 by a hydraulic line 314. In such embodiments, the movement of the two cylinders 306, 312 may be synchronized to fold and unfold the marker arms 302, 308 together. In other embodiments, the second cylinder 312 may be connected the same hydraulic source as the first cylinder 306. The cylinders 306, 312 may be controlled by a single common valve or by separate valves.

Though the marker device 122 is shown as connected to the end of the second marker arm 308, the second marker arm 308 may in some embodiments be omitted. The marker device 122 would then be connected to the end of the first marker arm 302 (i.e., at a point near where the second pivot joint 310 is pictured in FIG. 3). The marker device 122 may be, for example, a coulter assembly (e.g., a wheel on a bearing) that can make a trench in the field, a material dispenser (to dispense, e.g., foam, paint, etc.), or any other device to mark a field location. When the foldable marker assembly 120 is extended, the marker device 122 can extend from the frame 108 by a distance approximately equal to the sum of the lengths of the first marker arm 302 and the second marker arm 308. When folded, the foldable marker assembly 120 does not interfere with the tank 112 or other parts of the implement 300.

Figure 4:
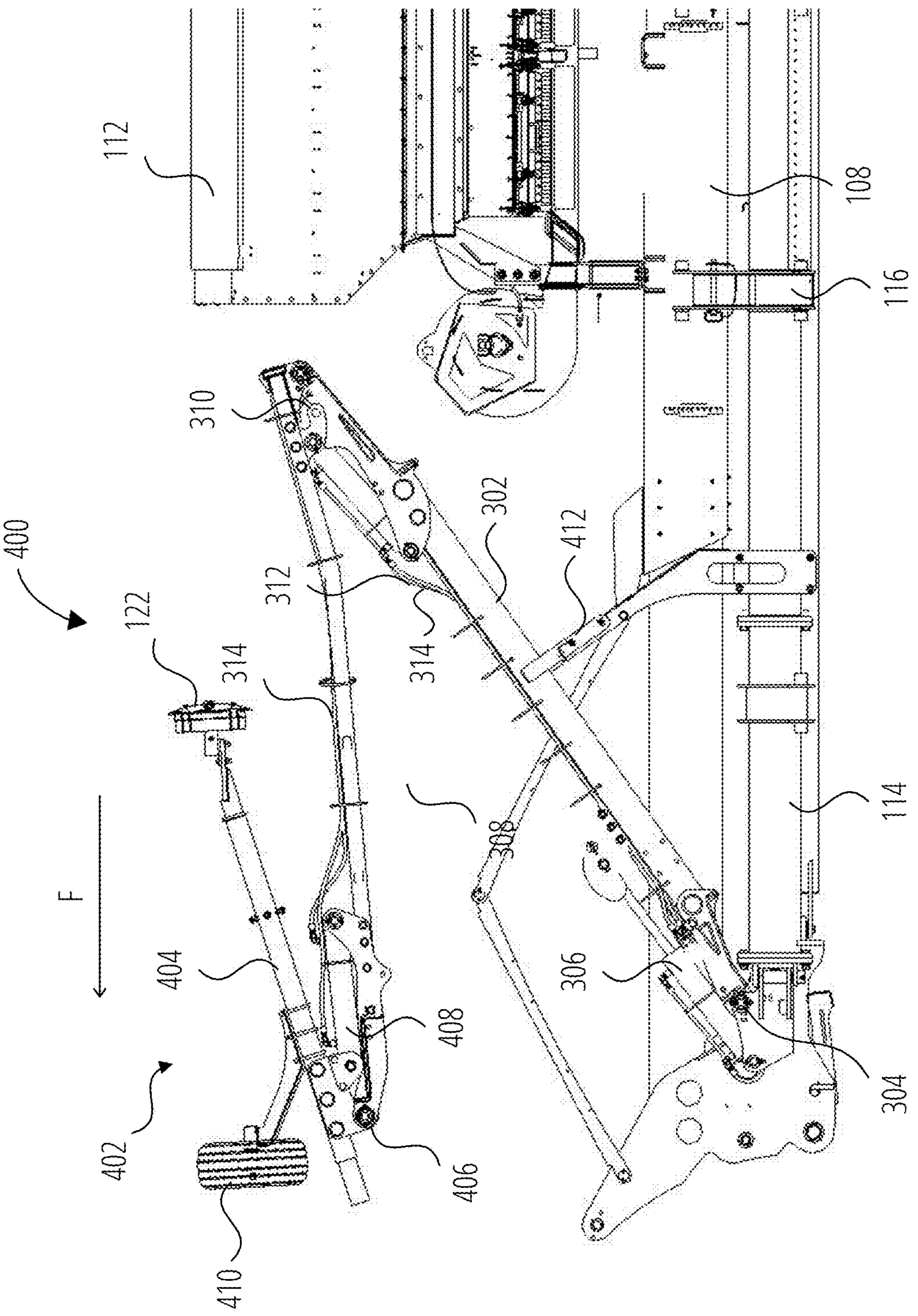
FIG. 4 is a simplified side view of another implement with another foldable marker assembly in a folded configuration.

FIG. 4 is a simplified side view of another agricultural implement 400 having a foldable marker assembly 402 that can be folded for transport (as shown in FIG. 4) and extended to mark a location in a field. The foldable marker assembly 402 is similar to the foldable marker assembly 120 shown in FIG. 3, but has some additional parts. In particular, the foldable marker assembly 402 includes a third marker arm 404 connected to the second marker arm 308 at a third pivot joint 406. The marker device 122 is connected to the end of the third marker arm 404, rather than to the second marker arm 308. In the folded configuration, the third marker arm 404 is positioned at an acute angle relative to the second marker arm 308. A third cylinder 408 may control the orientation (i.e., angle) of the third marker arm 404 relative to the second marker arm 308.

The foldable marker assembly 402 may also include one or more stabilizing support wheels 410 to assist in keeping the marker device 122 in position to mark the field when the foldable marker assembly 402 is extended. In the folded position, the first marker arm 302 may rest on a stabilizing support 412.

In the foldable marker assemblies 120, 402 shown in FIG. 3 and FIG. 4, the marker arms 302, 308, 404 each form an acute angle with the adjacent marker arms and/or frame 108 when in their folded positions. Thus, the foldable marker assembly 120 does not interfere with the tank 112 or other parts of the implement 300.

Figure 5:
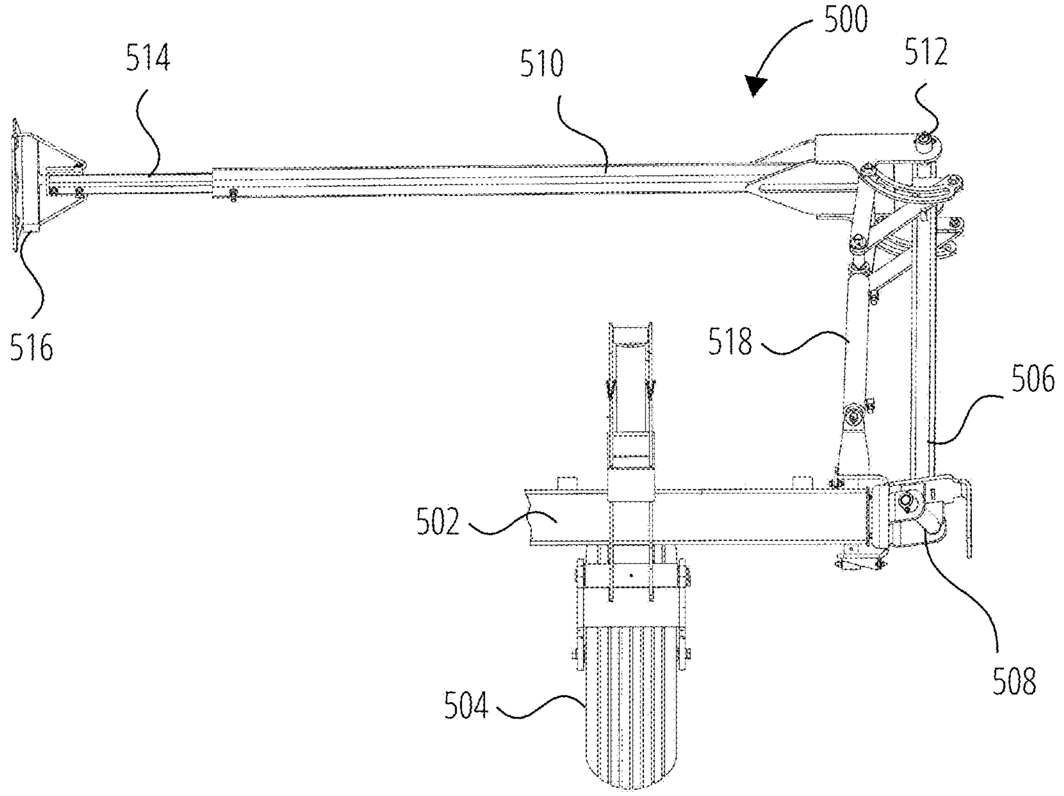
FIG. 5 (PRIOR ART)
FIG. 5 is a simplified drawing of a conventional foldable marker assembly in a folded configuration.
Figure 6:
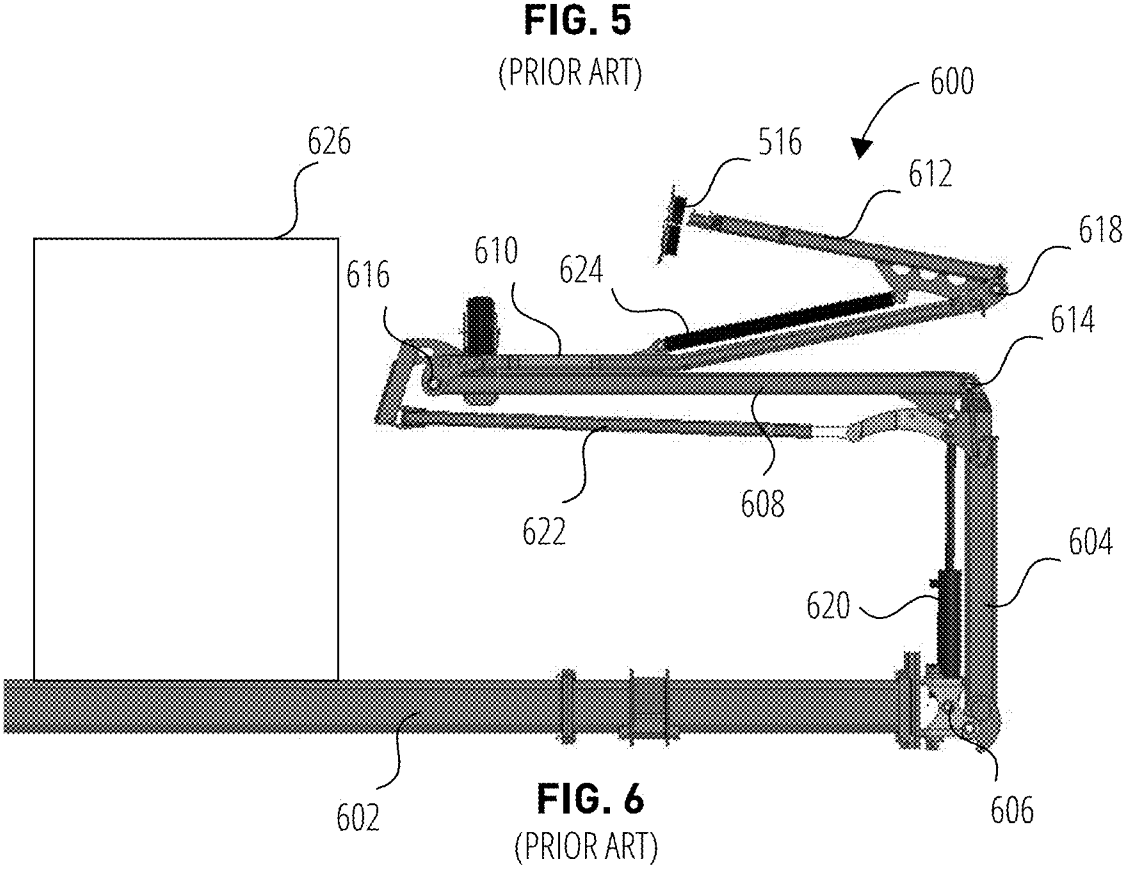
FIG. 6 (PRIOR ART)
FIG. 6 is a simplified drawing of another conventional foldable marker assembly in a folded configuration.

The foldable marker assemblies 120, 402 can enable the marker device 122 to reach farther with a similar number of marker arms than conventional foldable marker assemblies (e.g., foldable marker assemblies 500, 600 in FIG. 5 and FIG. 6) because the marker arms 302, 308, 404 are positioned to use the space between the end of the frame 108 and the tank 112 more efficiently. That is, the first marker arm 302 as shown in FIG. 3 and FIG. 4 can be longer than the marker arm 608 of FIG. 6 without interfering with the tank 112 because the first marker arm 302 extends along the longest dimension of an open space 316 (indicated generally by a dotted rectangle in FIG. 3), i.e., the diagonal. If the marker arms were folded at right angles (i.e., 90°) relative to the frame 108, each marker arm would be shorter than the diagonal of the rectangle 316. Furthermore, the shape of the tank 112 may be selected such that it intrudes within part of the rectangle 316 without inhibiting folding of the first marker arm 302.

The implements 300, 400 typically include foldable marker assemblies 120, 402 on each side (left and right). When traveling through a field, the foldable marker assembly 120, 402 corresponding to the portion of the field to be worked will typically be extended, while the foldable marker assembly 120, 402 on the other side will be folded in, as shown in FIG. 1.

The foldable marker assemblies 120, 402 may have fewer total parts and/or fewer unique parts than conventional foldable marker assemblies, because the marker arms can be longer than conventional marker arms, and thus, fewer marker arms may be needed for a given extension distance. Furthermore, positions of the marker arms 302, 308, 404 may be controlled with the cylinders 306, 312, 408, which may take less space and be less complex than pull arms or actuators typically used to move some conventional marker arms. If the cylinders 306, 312, 408 are selected to each be the same size, the number of unique parts decreases (which simplifies manufacturing and repair), and the cylinders 306, 312, 408 can be synchronized by routing hydraulic lines 314 between them. Cylinders 306, 312, 408 may be placed in tighter spaces than conventional mechanical pull arms, which enables folding the marker arms 302, 308, 404 to acute angles as shown in FIG. 3 and FIG. 4.

In some embodiments, the final marker arm (i.e., 314 in FIG. 3, 404 in FIG. 4, or 302 in an embodiment having only one folding marker arm) can include a sliding extension to increase the length that the marker device 122 can extend from the frame 108. For example, the extension can be similar to the extension 514 shown in FIG. 5 and described in U.S. Pat. No. 9,198,340.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventor. Further, embodiments of the disclosure have utility with different and various machine types and configurations.

What is claimed is:

1. An agricultural implement, comprising:

a frame supporting a plurality of ground-engaging tools;

a foldable marker assembly comprising a first marker arm coupled to the frame at a first pivot joint, wherein the first marker arm is operable to pivot between an extended position extending laterally outward from the frame, and a folded position at an acute angle relative to the frame;

a first cylinder coupled to the frame and the first marker arm, the first cylinder configured to control an orientation of the first marker arm relative to the frame;

a second marker arm coupled to the first marker arm at a second pivot joint, wherein the second marker arm is operable to pivot between an extended position extending laterally outward from the first marker arm, and a folded position at an acute angle relative to the first marker arm;

a second cylinder coupled to the first marker arm and the second marker arm, the second cylinder configured to control an orientation of the second marker arm relative to the first marker arm; and a hydraulic line connecting the first cylinder to the second cylinder and configured to supply hydraulic fluid from the first cylinder to the second cylinder, and wherein the first cylinder and the second cylinder are the same size.

2. The implement of claim 1, wherein the first cylinder comprises a hydraulic cylinder.

3. The implement of claim 1, wherein the second cylinder comprises a hydraulic cylinder.

4. The implement of claim 3, wherein the first cylinder is connected to a hydraulic source.

5. The implement of claim 1, wherein the foldable marker assembly further comprises a third marker arm coupled to the second marker arm at a third pivot joint, wherein the third marker arm is operable to pivot between an extended position extending laterally outward from the second marker arm, and a folded position at an acute angle relative to the second marker arm.

6. The implement of claim 1, wherein the frame is operable to fold between a field position and a transport position, wherein in the field position, the frame is oriented perpendicular to a forward direction of travel, and wherein in the transport position, the frame is oriented toward or parallel to the forward direction of travel.

7. The implement of claim 1, wherein the foldable marker assembly further comprises a marker device.

8. The implement of claim 7, wherein the marker device comprises a coulter assembly.

9. The implement of claim 7, wherein the marker device comprises a material dispenser.

10. The implement of claim 1, wherein the foldable marker assembly comprises a support wheel.

11. The implement of claim 1, further comprising a stabilizing support coupled to the frame and configured to support the first marker arm in the folded position.

12. The implement of claim 5, further comprising:

a third cylinder coupled to the third marker arm and the second marker arm, the third cylinder configured to control an orientation of the third marker arm relative to the second marker arm, wherein the third cylinder is the same size as the first and second cylinders; and a second hydraulic line connecting the second cylinder to the third cylinder and configured to supply hydraulic fluid from the second cylinder to the third cylinder.

* * * * *